Oct. 5, 1948.  P. P. HANSON  2,450,510
MILK CAN STRAINER ACCOMMODATING ATTACHMENT
Filed Jan. 7, 1946
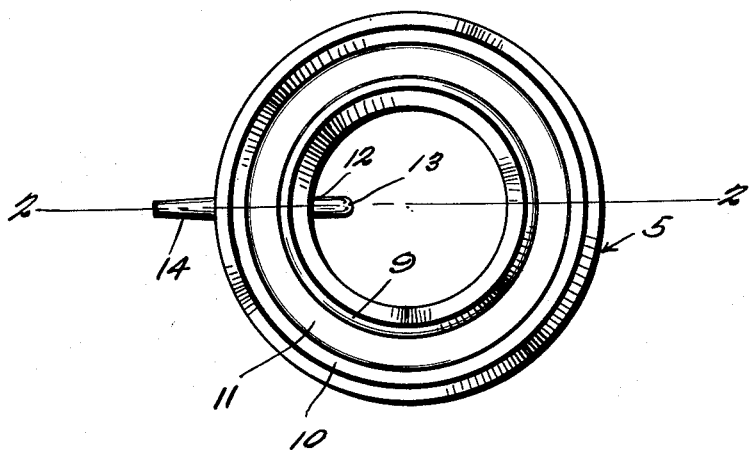
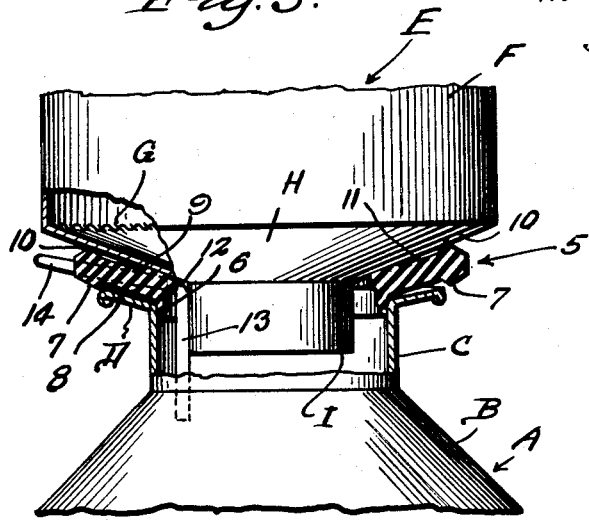
PETER P. HANSON Inventor
By Clarence A. O'Brien and Harvey B. Jacobson
Attorneys

UNITED STATES PATENT OFFICE 2,450,510

MILK CAN STRAINER ACCOMMODATING ATTACHMENT

Peter P. Hanson, Pocahontas, Iowa

Application January 7, 1946, Serial No. 639,627

2 Claims. (Cl. 210—155)

The present invention relates to a simple and practical device which may be conveniently referred to as an attachment for the flanged neck of a conventional milk containing and transporting can, said attachment being expressly designed and appropriately constructed to accommodate and provide an effective seating mount for a conventional strainer, that is a strainer of a type ordinarily used in the procedure of filling a milk can.

More particularly, the invention comprises a special gasket-like fitting which is constructed in cross section to accommodate both the strainer and can, the same being interposed between coacting portions of the strainer and can, this in a manner to provide a substantially tight fluid-proof connection and to expedite the passage and delivery of milk from the strainer into the storing and shipping can.

Further and by way of introduction, the invention appertains to a novel and ingenious attachment for disposition between the can and strainer, the same serving to render the milk strainer more efficient so that the straining result can be accomplished in less time and with less labor, particularly when used in connection with vacuum milking machines. Due to its nature, the attachment, as indicated, functions as a gasket between coacting surfaces of the strainer and can, the purpose being to create a vacuum chamber within the can and below the screen of the strainer, the suction created by the vacuum thus serving to set up the forces necessary to exert a downward pull on the milk and to "suck" same through the strainer proper.

In carrying out the principles of the invention I achieve the desired ends through the instrumentality of a rubber ring of sufficient proportions, this being shaped to fit down on the flanged neck of the can and having special ribs to accommodate the customary conical base portion of the conventional strainer, there being an L-shaped tube embedded in said ring with one end leading to the interior of the can and the other end arranged on the exterior to accommodate a suction creating hose (not shown) forming a part of a "vacuum" milking machine.

Other objects, features and advantages of the invention will become more readily apparent from the following description and the accompanying illustrative drawing.

In the drawing, wherein like numerals are employed to designate like parts throughout the views:

Figure 1 is a top plan view of the attachment per se separated from the assembly seen in Figure 3.

Figure 2 is a cross section taken approximately on the plane of the line 2—2 of Figure 1.

Figure 3 is a view partly in section and partly in elevation showing the attachment interposed between the flanged neck of a milk can and the bottom of a conventional milk strainer.

Reference is had first to Figure 3 in which the general assembly and association of devices is depicted. Here the conventional milk containing and shipping can is denoted by the reference character A, the same including the customary tapering upper end portion B merging into a reduced filler and pouring neck C, the latter having the usual outstanding annular flange D.

The milk strainer which is also conventional is denoted by the reference character E and includes a cylindrical body portion F, a filter or strainer screen G, a tapered underlying bottom H and a neck I to fit down into the neck C. The gasket attachment, which is interposed between the parts is generally denoted by the reference numeral 5.

As before indicated, the device 5 is in the form of an annulus or ring of appropriate taper and dimensions. The ring is primarily made to provide an annular lip 6 which slips down into and firmly contacts the interior of the can neck C. Then, on the under side of the ring near the outer marginal edge is an endless V-shaped rib 7 which when applied fits down tight around the outer marginal bead on the flange D. The portion 8 between rib 7 and lip 6 rests firmly on the top of the flange and provides a fluid tight connection between the flange and ring 5. The upper surface of the ring is provided with an inner annular rib 9 and a complemental outer radially spaced V-shaped marginal rib 10, these ribs being spaced apart to provide a sort of a channel 11 which is spaced from the bottom portion H of the milk strainer. The ribs serve as effective seats for the strainer and yet excessive surface contact is reduced by providing space afforded by the surface 11 to permit the can to be readily placed in position and freely removed without too much difficulty.

As before indicated, I desire to provide means to produce the desired suction. This comprises an L-shaped tube or pipe, the same being denoted at 12 and having its body portion embedded in and extending through and beyond the inner and outer peripheral edges of said rubber ring. The inner downturned end 13 extends into the milk can as shown in Figure 3. The outer exposed end is tapered as indicated at 14, this to accommodate a hose (not shown) on a vacuum or so-called suction milking machine.

By assembling the parts as brought out in Figure 3 and attaching a suction hose to the fitting 14, the desired degree of suction is produced on the interior of the neck portion of the can A and this to create a downward pull on the screen G.

It follows that the forces thus set up draw on and suck the milk down through the strainer and cause it to flow with greater rapidity and readiness into the can. Obviously, the use of this attachment makes it possible to use a heavier cotton disc in connection with the strainer and hence all foreign matter is separated and more effective results are attained.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

I claim:

1. A rubber gasket ring adapted to be interposed between a conventional type milk strainer and an associated milk can and comprising a ring having on its inner peripheral edge a depending endless lip adapted to telescope into the interior of the milk can neck, the under side of said ring, adjacent the outer peripheral edge of the ring, being provided with a V-shaped rib adapted to fit down tight against the outer marginal edge of the usual bead on the flange of the milk can neck, the upper surface of said ring being provided with an inner annular rib and a radially spaced complemental outer V-shaped upstanding marginal rib, said ribs being spaced apart to provide a channelway therebetween and said ribs being adapted to seat a portion of the strainer while retaining a predetermined area thereof away from contact with said ring.

2. The structure specified in claim 1, together with a simple L-shaped suction pipe, one branch thereof being transversely embedded in said ring, the outer end of said branch being adapted to accommodate a hose from a vacuum milking machine, the remaining branch being situated inwardly of the inner peripheral edge portions of said ring and depending at right angles in order to situate, when in use, in the milk can neck.

PETER P. HANSON.

REFERENCES CITED

The following references are of record in the file of this patent:

UNITED STATES PATENTS

| Number | Name | Date |
| --- | --- | --- |
| 1,115,505 | Chapin | Nov. 3, 1914 |
| 1,494,691 | Loggie et al. | May 20, 1924 |